US012798688B2

(12) United States Patent
Aimoto et al.

(10) Patent No.: US 12,798,688 B2
(45) Date of Patent: Nov. 17, 2026

(54) JOINING STRUCTURE AND JOINING METHOD FOR VEHICLE MEMBER

(71) Applicant: TOYOTA JIDOSHA KABUSHIKI KAISHA, Toyota (JP)

(72) Inventors: Mitsuhiro Aimoto, Nisshin (JP); Yuri Ichikawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 18/740,533

(22) Filed: Jun. 12, 2024

(65) Prior Publication Data

US 2025/0128770 A1 Apr. 24, 2025

(30) Foreign Application Priority Data

Oct. 19, 2023 (JP) ................................ 2023-180524

(51) Int. Cl.

| | |
|---|---|
| ***B23K 9/02*** | (2006.01) |
| ***B23K 9/025*** | (2006.01) |
| ***B23K 26/242*** | (2014.01) |
| ***B62D 27/02*** | (2006.01) |
| ***B62D 29/00*** | (2006.01) |

(52) U.S. Cl.

CPC ............ *B62D 27/023* (2013.01); *B23K 9/025* (2013.01); *B23K 26/242* (2015.10); *B62D 29/008* (2013.01)

(58) Field of Classification Search

CPC ......... Y10T 403/477; F16B 9/01; B23K 9/02; B23K 9/025; B23K 26/242; B23K 26/26

See application file for complete search history.

(56) References Cited

U.S. PATENT DOCUMENTS

| | | | | |
|---|---|---|---|---|
| 2,019,460 A * | 10/1935 | Mahan | B23K 33/00 | 219/137 R |
| 5,190,207 A * | 3/1993 | Peck | B23K 33/006 | 403/14 |
| 5,332,281 A * | 7/1994 | Janotik | B62D 21/02 | 52/696 |
| 7,001,097 B2 * | 2/2006 | Wang | F16B 9/09 | 403/231 |
| 8,899,868 B2 * | 12/2014 | Trivette | B23K 31/022 | 403/231 |
| 9,950,747 B2 * | 4/2018 | Mashio | B60R 19/04 | |
| 10,035,208 B2 * | 7/2018 | Tsuchiya | B23K 9/028 | |
| 2015/0196967 A1 | 7/2015 | Tsuchiya et al. | | |

FOREIGN PATENT DOCUMENTS

| | | | |
|---|---|---|---|
| JP 60-12281 * | 1/1985 | B23K 9/02 |
| JP 2010-076762 A | 4/2010 | |
| WO 2014/084317 A1 | 6/2014 | |

* cited by examiner

*Primary Examiner* — Michael P Ferguson

(74) *Attorney, Agent, or Firm* — SoraIP, Inc.

(57) ABSTRACT

The skeleton member includes a cut and a welded portion, and the cut is formed in the skeleton member and extends along the ridge line so that the ridge line is exposed. In addition, in the welded portion, the skeleton member is welded to the skeleton member along the cut along the ridge line by fillet welding. In this way, no welded portion is provided on the ridge line. Since the rigidity in the ridge line portion is higher than the periphery and the shared load is also large, it is possible to reduce cracking starting from the ridge line portion by not providing the welded portion in the ridge line.

7 Claims, 6 Drawing Sheets

JOINING STRUCTURE AND JOINING METHOD FOR VEHICLE MEMBER

CROSS-REFERENCE TO RELATED APPLICATION

This application claims priority to Japanese Patent Application No. 2023-180524 filed on Oct. 19, 2023, incorporated herein by reference in its entirety.

BACKGROUND

1. Technical Field

The present disclosure relates to joining structures and joining methods for vehicle members.

2. Description of Related Art

WO2014/084317 discloses a technique of welding a member having a ridge line and a member in the form of a flat plate. In this related art, a welded portion includes a stiffening bead extending from a fillet bead at the position of the ridge line, which reduces cracking due to fatigue of the welded structural members joined to each other.

SUMMARY

In the above related art, however, the member having a ridge line and the member in the form of a flat plate are welded together. In the case where members having a ridge line are welded together, stiffness of the ridge line portion is higher than that of the portion around the ridge line portion. Therefore, the shared load of the welded portion of the ridge line portion is large, so that cracking may occur in the welded portion, starting from the ridge line portion.

An object of the present disclosure is to provide a joining structure and joining method for a vehicle member that can reduce cracking starting from a welded portion of a ridge line portion.

A joining structure for a vehicle member according to a first aspect of the present disclosure includes:

- a first vehicle member having a first ridge line in an extending direction of the first vehicle member; and
- a second vehicle member having a second ridge line that overlaps the first ridge line in an extending direction of the second vehicle member, and provided with a first welded portion in which the second vehicle member is welded to the first vehicle member from outside by lap fillet welding.

The joining structure includes

- a cut provided in the second vehicle member and extending along the second ridge line so as to expose the first ridge line, and
- a second welded portion in which the second vehicle member is welded to the first vehicle member along the cut by fillet welding with the first ridge line located inside the cut.

The joining structure according to the first aspect includes the first vehicle member and the second vehicle member. The first ridge line of the first vehicle member extends in the extending direction of the first vehicle member. The second ridge line of the second vehicle member that overlaps the first ridge line extends in the extending direction of the second vehicle member, and the second vehicle member is welded to the first vehicle member from outside by lap fillet welding (first welded portion).

In the present disclosure, the joining structure includes the cut and the second welded portion. The cut is provided in the second vehicle member and extends along the second ridge line so as to expose the first ridge line. In the second welded portion, the second vehicle member is welded to the first vehicle member along the cut by fillet welding with the first ridge line located inside the cut. That is, the first welded portion is a portion excluding the cut where the first vehicle member and the second vehicle member are welded by fillet welding, and the second welded portion is a portion along the cut where the first vehicle member and the second vehicle member are welded by fillet welding. In the present disclosure, the vehicle members are joined together by the first welded portion and the second welded portion.

In the present disclosure, the second welded portion is provided along the cut with the first ridge line located inside the cut. That is, the second welded portion is not provided on the first ridge line. Stiffness of the ridge line portion is higher than that of the portion around the ridge line portion and the shared load of the ridge line portion is therefore large. Accordingly, in the present disclosure, cracking starting from the ridge line portion can be prevented by not providing the second welded portion on the first ridge line. Since fillet welding is performed along the cut, the weld length can be increased. This can compensate for shortage of the joining strength due to the absence of the second welded portion on the first ridge line.

In the first aspect, the second welded portion may include a pair of weld lines facing each other.

With the above configuration, the second welded portion includes the weld lines facing each other. The weld lines can therefore be lines parallel to a line in a direction in which stress acts on a root portion of the ridge line under large shared load. Accordingly, it is possible to improve fatigue strength in the direction in which the stress acts.

In the first aspect, a length of the weld line may be set to be longer than a dimension of an entrance portion of the cut measured along an outer shape of the first vehicle member across the first ridge line.

With the above configuration, the length of the weld line is set to be longer than the dimension of the entrance portion of the cut measured along the outer shape of the first vehicle member across the first ridge line. The weld length can thus be made longer than in a comparative example in which a cut is not provided and a welded portion is formed across a ridge line. In the present disclosure, this can compensate for shortage of the joining strength due to the absence of the second welded portion on the first ridge line. Moreover, since the weld length is increased, it is possible to improve fatigue strength.

In the first aspect, the first vehicle member and the second vehicle member may be made of an aluminum alloy.

With the above configuration, the first vehicle member and the second vehicle member are made of an aluminum alloy. In aluminum arc welding, the strength difference between a base material and a bead is large, and cracking is more likely to occur in a root portion than in the case of iron. However, according to the present disclosure, it is possible to effectively reduce cracking in the root portion even in the aluminum arc welding.

A joining method for a vehicle member according to a second aspect is a joining method using the vehicle member according to the first aspect. The joining method includes: a cut forming step of forming a cut along the second ridge line in the second vehicle member in such a manner that the second ridge line is located inside the cut;

a member overlapping step of placing the second vehicle member on an outside of the first vehicle member in an overlapping manner in such a way that the second ridge line overlaps the first ridge line; and a welding step of performing fillet welding along an overlapping portion of the first vehicle member and the second vehicle member.

The joining method according to the second aspect includes the cut forming step, the member overlapping step, and the welding step. In the cut forming step, a cut is formed along the second ridge line in the second vehicle member in such a manner that the second ridge line is located inside the cut. Next, in the member overlapping step, the second vehicle member is placed on the outside of the first vehicle member in an overlapping manner in such a way that the second ridge line overlaps the first ridge line. Then, in the welding step, fillet welding is performed along the overlapping portion of the first vehicle member and the second vehicle member.

As described above, according to the joining structure and joining method for a vehicle member according to the present disclosure, it is possible to reduce cracking starting from the welded portion of the ridge line portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment according to the present disclosure will be described in detail with reference to the drawings.

Configuration of Joining Structure of Vehicle Member

First, a configuration of a joining structure of a vehicle member according to the present embodiment will be described.

Figure 1A:
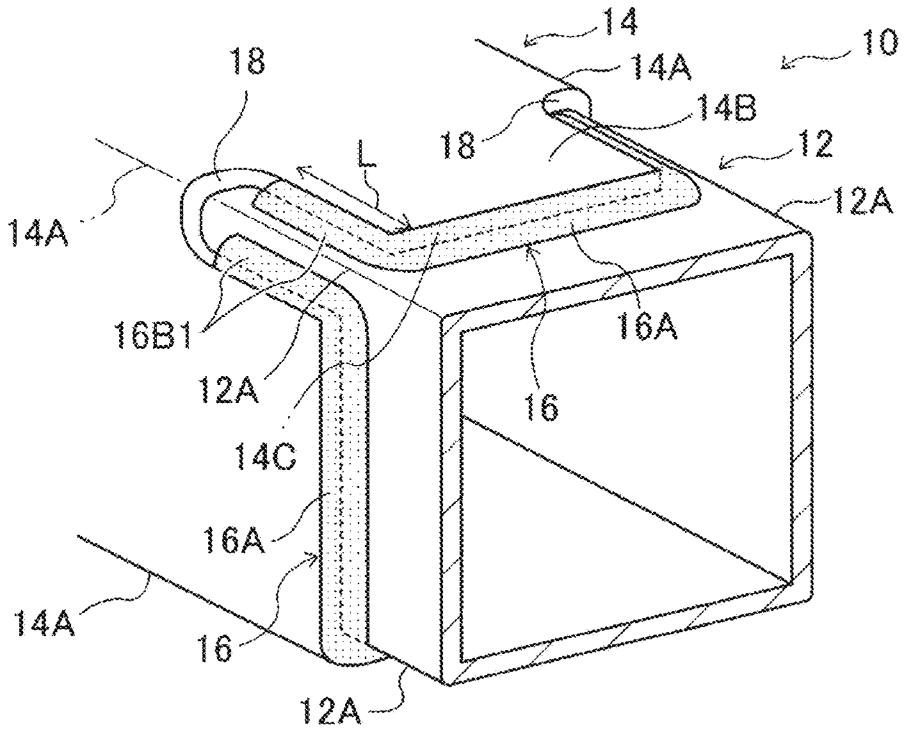
FIG. 1A is an enlarged perspective view of a main part showing a welded portion of a skeleton member having a joining structure of a vehicle member according to an embodiment.
Figure 1B:
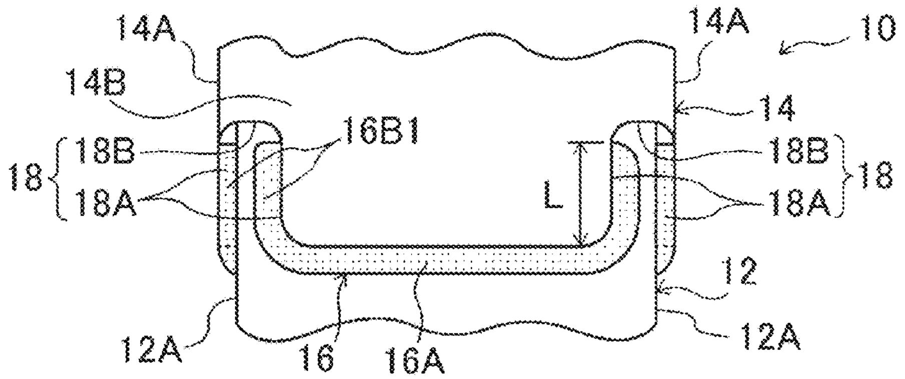
FIG. 1B is a plan view of FIG. 1A.
Figure 1C:
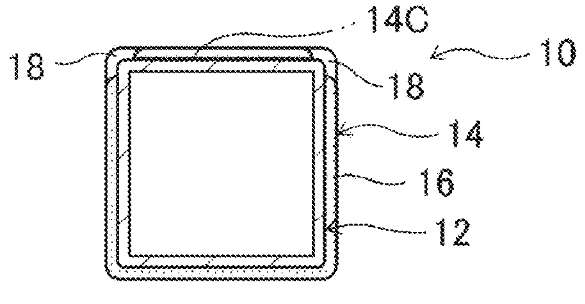
FIG. 1C is a right side view of FIG. 1A.

As shown in FIGS. 1A to 1C, the vehicle skeleton member 10 to which the joining structure for the vehicle member according to the present embodiment is applied includes a skeleton member (first vehicle member) 12 and a skeleton member (second vehicle member) 14.

The skeleton members 12 and 14 are each made of, for example, an aluminum alloy. The skeleton member 14 is formed so as to have a substantially larger outer shape of the skeleton member 12 than the skeleton member 12, and the skeleton member 12 is inserted into the skeleton member 14 so that the skeleton member 14 overlaps with the skeleton member 12 from outside.

In the present embodiment, the skeleton members 12 and 14 are formed in a square tube shape, for example, four ridge lines (first ridge line) 12A, ridge line (second ridge line) 14A are provided, respectively. With the skeleton member 12 inserted into the skeleton member 14, the ridge line 12A of the skeleton member 12 and the ridge line 14A of the skeleton member 14 are vertically overlapped, and in this state, the skeleton member 12 and the skeleton member 14 including the end face 14C of the skeleton member 14 are welded by fillet welding (lap fillet welding) (welded portion 16).

Figure 2:
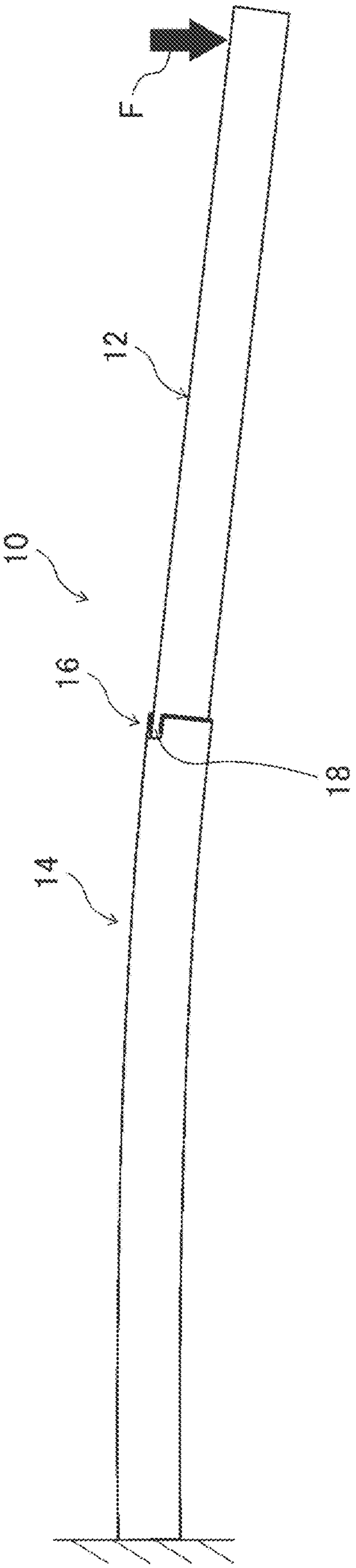
FIG. 2 is a side view illustrating a state in which a load is input to a free end of a skeleton member including a joining structure of a vehicle member according to the present embodiment.

Here, as shown in FIG. 2, when a load F is input to the free end of the skeleton member 10 in which the skeleton members 12 and 14 are welded by fillet welding in a cantilevered state, a bending stress acts on the skeleton member 10 in the welded portion 16.

Figure 7:
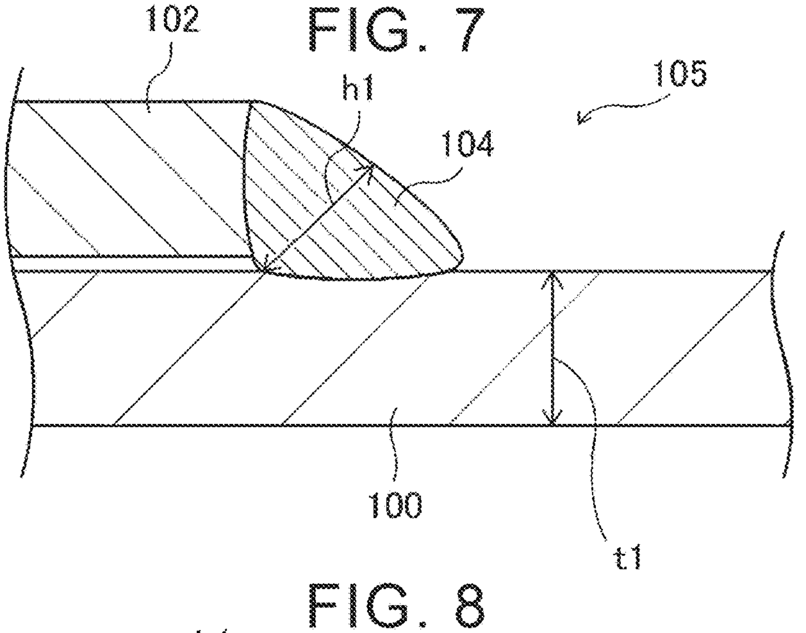
FIG. 7 is a cross-sectional view taken along VII-VII line of FIG. 6.

At this time, the bending stress $\sigma$ at the welded portion 16 is expressed by $\sigma \approx M/bh^2$, and is inversely proportional to $h^2$. Note that M is the bending moment, and b is the length dimension along the welding in a direction perpendicular to the direction in which the stress acts in the cross section of the skeleton member 10. In the comparative embodiment, h is the throat thickness h1 shown in FIG. 7. In the welded portion 104, cracking may occur at the root of the welded portion 104 when stress is applied (so-called root cracking). For this reason, the throat thickness h1 is typically set to about 0.7 times the base material thickness t1.

On the other hand, as shown in FIGS. 1A and 1B, in the present embodiment, h is the weld length L. In the case of welding, for example, a section of about 10 mm at the beginning of the welding and a section of about 5 mm at the end of the welding may be assumed to have insufficient penetration of the welding as compared with a section in the middle of the welding, depending on conditions. In this way, if the penetration is insufficient, cracking may occur at the welded portion 16 when a stress is applied (so-called start/end cracking). Therefore, the length of the weld line 16B1 (the weld length L), which will be described later, is set in the present embodiment, considering that amount.

As shown in FIG. 2, in view of the fact that bending stresses act on the skeleton member 10, in the present embodiment, as shown in FIGS. 1A to 1C, the skeleton member 14 has cuts 18 formed along at least two ridge lines 14A in the upper wall portion 14B. The cut 18 is cut out in a long hole shape with respect to the ridge line 14A. Therefore, when the skeleton member 12 is inserted into the skeleton member 14, a part of the ridge line 12A of the skeleton member 12 is exposed through the cut 18.

Figure 6:
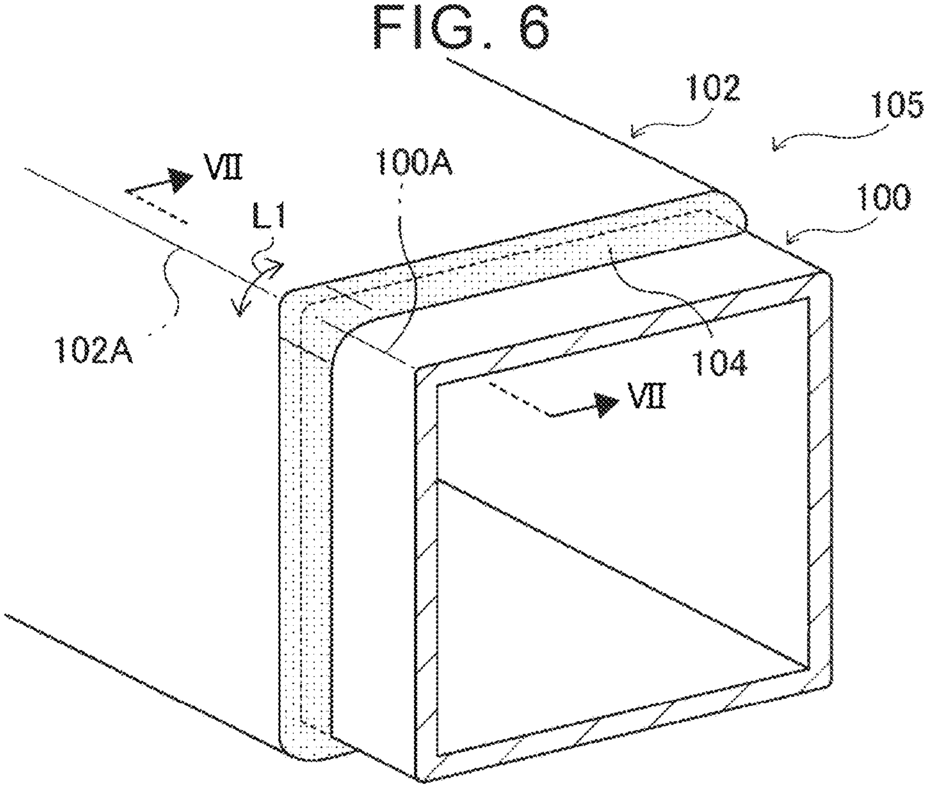
FIG. 6 is an enlarged perspective view of a main part corresponding to a view 1A illustrating a welded portion of a skeleton member according to a comparative embodiment.
Figure 8:
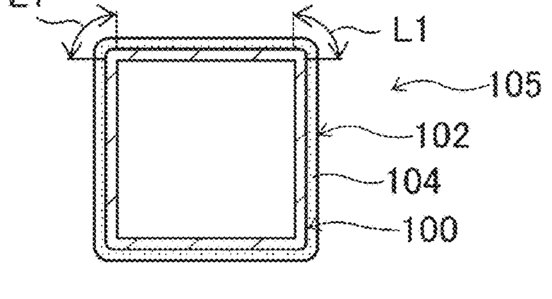
FIG. 8 is a right side view of FIG. 6.

The cut 18 includes a pair of straight portion 18A that are formed from the entrance portion of the cut 18 toward the rear side and are arranged to face each other, and a circular hole portion 18B that is provided in the rear portion of the cut 18 and connects the pair of straight portion 18A in an arc shape. As shown in FIGS. 6 and 8, the length of the straight portion 18A is set to be longer than the dimension L1 measured along the outer shape of the skeleton member 100 across the ridge line 100A of the skeleton member 100 without the cut in the skeleton member 102.

In the present embodiment, as shown in FIGS. 1A to 1C, fillet welding is performed along the end face 14C of the skeleton member 14 with the cuts 18 formed along the two ridge lines 14A in the upper wall portion 14B of the skeleton member 14 (welded portion 16). The welded portion 16 includes a welded portion (first welded portion) 16A and a welded portion (second welded portion) 16B, and the welded portion 16A is provided at a portion except for the cut 18, and the welded portion 16B is provided at a portion in the cut 18.

Here, in the present embodiment, the welded portion 16B is constituted by a pair of weld lines 16B1. That is, fillet welding is performed in the pair of straight portions 18A constituting the cut 18, and the weld line 16B1 is divided by the circular hole portion 18B.

Action and Effect of Joining Structure of Vehicle Member

Next, the operation and effects of the joining structure of the vehicle member according to the present embodiment will be described.

In the present embodiment, as shown in FIGS. 1A to 1C, the skeleton member 12 and the skeleton member 14 are provided in the skeleton member 10 for a vehicle to which the joining structure of the vehicle member is applied. In the present embodiment, the joining method of the vehicle member includes, for example, a cut forming step, a member overlapping step, and a welding step.

In the cut forming step, the cuts 18 are formed along the ridge lines 14A in the upper wall portion 14B of the skeleton member 14 so that the ridge lines 14A are located inside the cuts 18. Next, in the member overlapping step, the skeleton member 12 is inserted into the skeleton member 14 such that the ridge line 12A overlaps with the ridge line 14A from outside. Then, in the welding step, fillet welding is performed including the end face 14C of the skeleton member 14 at a portion where the skeleton member 12 and the skeleton member 14 overlap with each other (welded portion 16).

By the joining method as described above, the skeleton member 14 is welded by fillet welding to the skeleton member 12 from outside through the welded portion 16 in an overlapping state, it is integrated with the skeleton member 12 (skeleton member 10).

Specifically, in the present embodiment, the skeleton member 10 includes the cut 18 and the welded portion 16B, and the cut 18 is formed in the skeleton member 14 and cut along the ridge line 14A so that the ridge line 12A is exposed. In addition, in the welded portion 16B, the skeleton member 14 is welded to the skeleton member 12 by fillet welding along the cut 18 in the ridge line 12A.

Here, the welded portion 16 includes a welded portion 16A in which the skeleton member 12 and the skeleton member 14 are welded by fillet welding at a portion excluding the cut 18, and a welded portion 16B in which the skeleton member 12 and the skeleton member 14 are welded by fillet welding at a portion in the cut 18. In the present embodiment, the skeleton member 12 and the skeleton member 14 are integrated by the welded portion 16A and the welded portion 16B.

As described above, in the present embodiment, the welded portion 16B is not provided in the ridge line 12A because the welded portion 16B is provided along the cut 18 with the ridge line 12A therebetween. Since the stiffness in the ridge line portion is higher than the periphery and the shared load is also large, cracking starting from the ridge line portion can be reduced in the present embodiment by not providing the welded portion 16B in the ridge line 12A.

Further, in the present embodiment, since the welded portion 16B includes a pair of weld lines 16B1 provided to face each other, the weld line 16B1 can be a line parallel to a line along a direction in which stress acts in a root portion of a ridge line having a large shared load, and can be strengthened with respect to the fatigue strength in a direction in which stress acts.

In general, when root cracking, end cracking, and toe cracking are compared with respect to the strength of the cracking mode in the welded portion, root cracking<start/end cracking<toe cracking. Here, root cracking causes a crack at a root portion of the welded portion. Start/end cracking causes a crack at the start and terminal ends of the welded portion. The toe cracking causes a crack in a surface where the base material and the welded portion intersect. That is, root cracking has the lowest strength. Therefore, the strength in the welded portion can be effectively improved by improving the strength in the root portion.

In the present embodiment, as shown in FIGS. 1A and 1B, the weld length L of the weld line 16B1 is set to be longer than the dimension L1 measured along the outer shape of the skeleton member 100 at the welded portion 104, as shown in FIGS. 6 and 8. Here, the welded portion 104 is welded across the ridge line 100A without providing the cut.

Thus, in the present embodiment, as shown in FIG. 1A, the shortage of the joining strength due to the absence of the welded portion 16B in the ridge line 12A can be complemented by making the weld length L longer than the dimension L1 (see FIG. 6). Further, it is possible to strengthen the fatigue strength by lengthening the weld length L than in the comparative example.

Figure 3A:
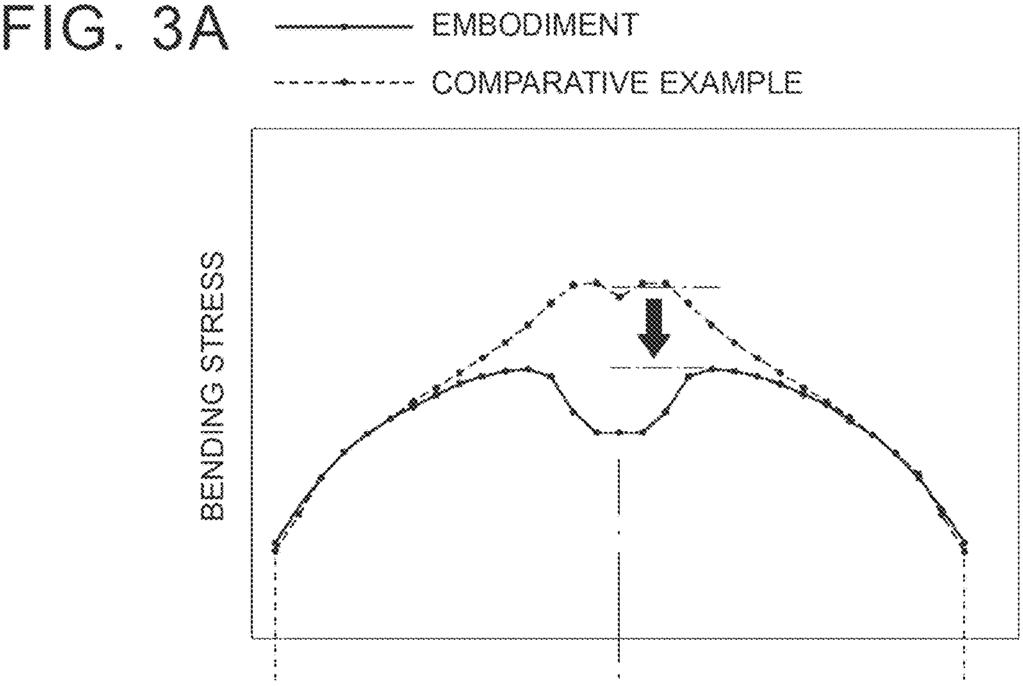
FIG. 3A shows the stress-distributions analyzed by the analytical solver acting on the skeleton members with ridge lines forming 90 degree.
Figure 4A:
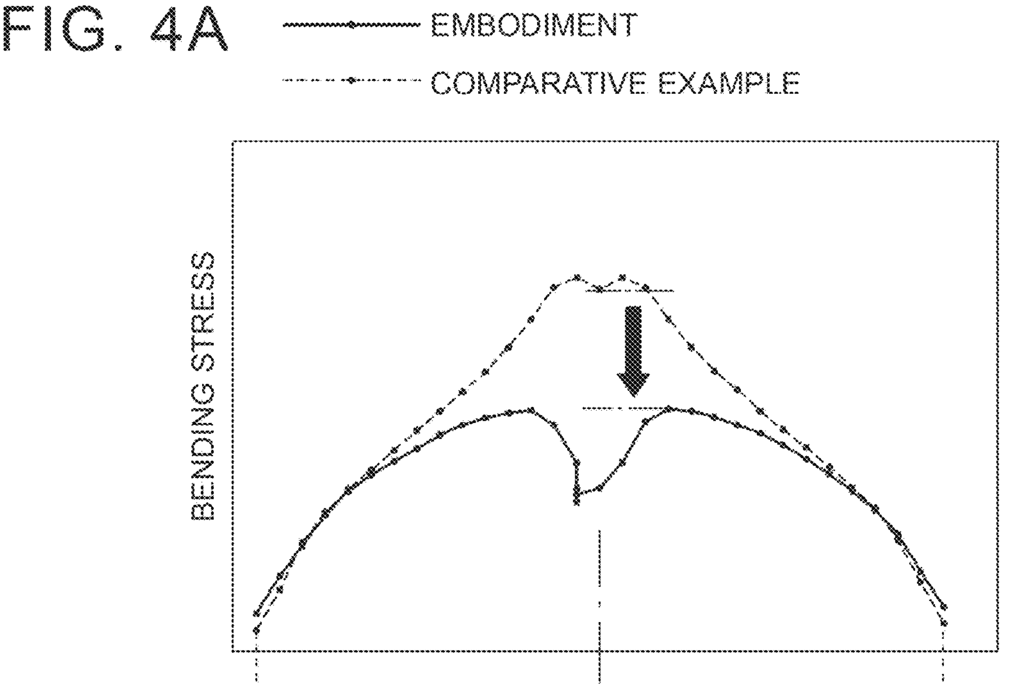
FIG. 4A shows the stress-distributions analyzed by the analytical solver acting on the skeleton members whose ridge lines form 130 degrees.

FIGS. 3A and 4A show the analysis results by the analysis solver showing the stress distribution acting on the skeleton members 10 and 105. The solid line indicates a stress distribution indicating an analysis result of the skeleton member 10 in the present embodiment, and the broken line indicates a stress distribution indicating an analysis result of the skeleton member 105 as a comparative example.

Figure 3B:
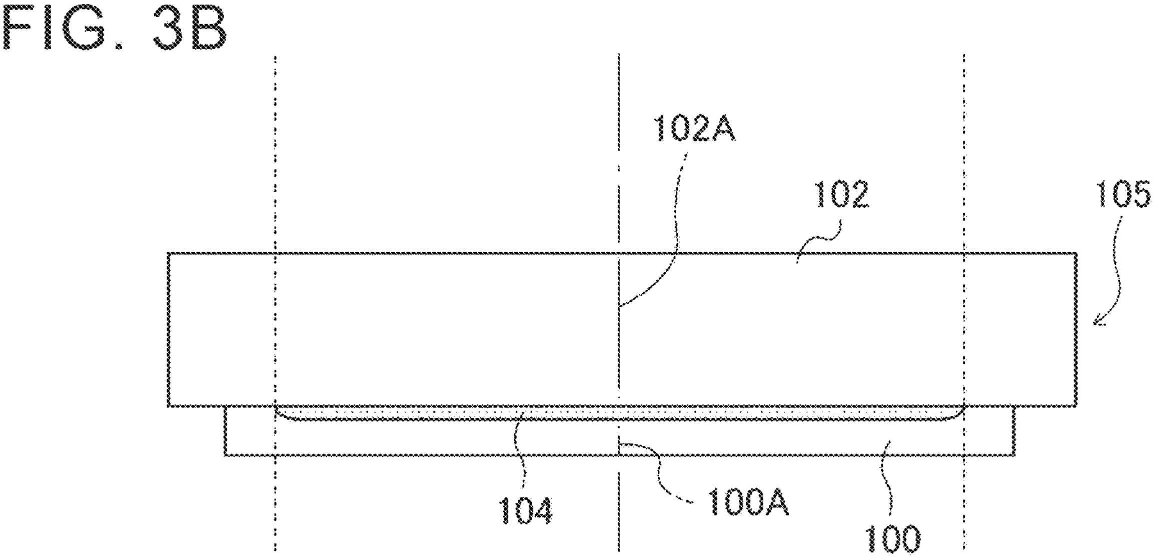
FIG. 3B is an exploded view around a ridge line of a skeleton member as a comparative example corresponding to a horizontal axis in FIG. 3A.
Figure 3C:
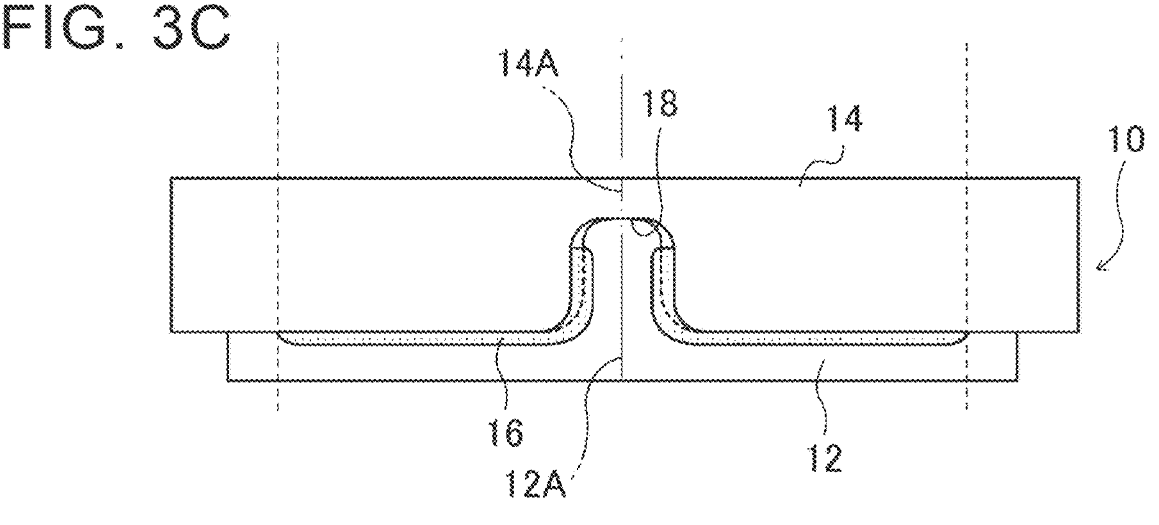
FIG. 3C is an exploded view centered on the ridge line of the skeleton member according to the present embodiment corresponding to the horizontal axis in FIG. 3A.

FIG. 3B is a developed view around the ridge line 102A in the skeleton member 105 as a comparative example shown in FIG. 3A, and FIG. 3C is a developed view around the ridge line 14A in the skeleton member 10 as the present embodiment shown in FIG. 3A. Each of the ridge lines 102A, 14A is approximately 90 degrees.

Figure 4B:
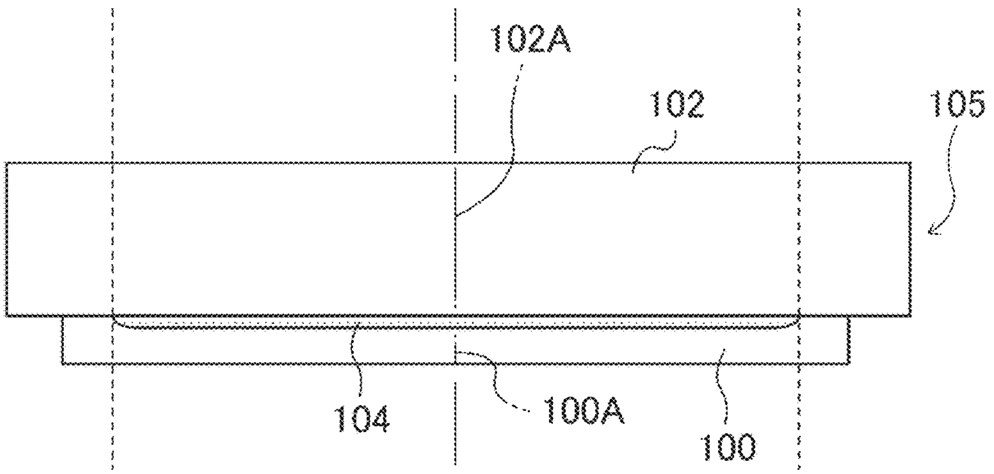
FIG. 4B is an exploded view about a ridge line of a skeleton member according to a comparative example corresponding to a horizontal axis in FIG. 4A.
Figure 4C:
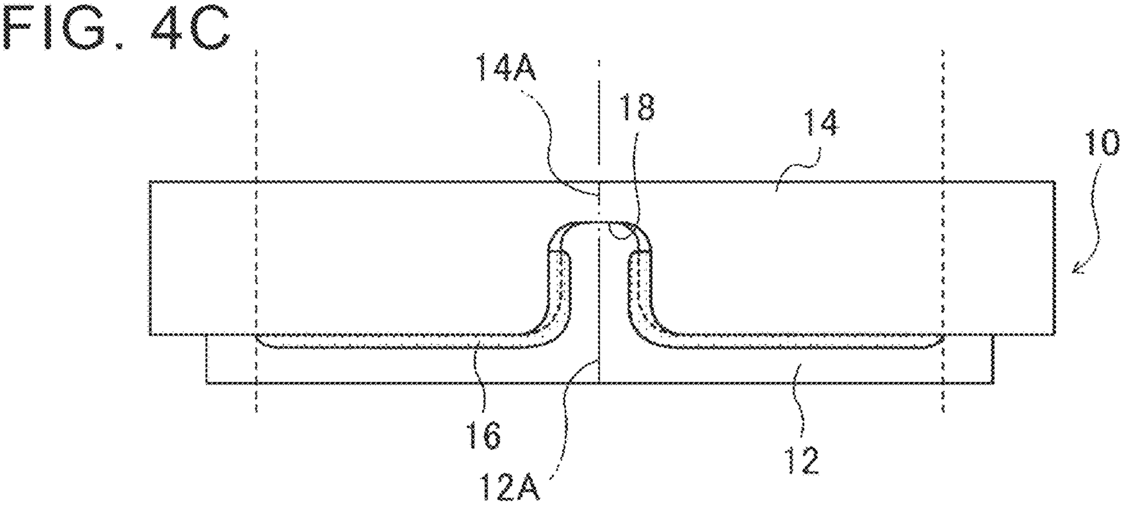
FIG. 4C is a development view centering on a ridge line of a skeleton member as this embodiment corresponding to a horizontal axis in FIG. 4A.

Further, FIG. 4B is an exploded view around the ridge line 102A in the skeleton member 105 as a comparative example shown in FIG. 4A, and FIG. 4C is an exploded view around the ridge line 14A in the skeleton member 10 as the present embodiment shown in FIG. 4A. Each of the ridge lines 102A, 14A is about 130 degrees.

As shown in FIGS. 3A and 4A, in the comparative example, the bending stress acting in the peripheral portion including the ridge line 102A is maximized, according to the present embodiment, it can be seen that the bending stress is reduced in the peripheral portion including the ridge line 14A (each indicated by an arrow). As described above, in the present embodiment, since the bending stresses in the peripheral portion including the ridge line 14A are reduced in the skeleton member 10 shown in FIGS. 1A to 1C, it can be seen that cracking starting from the ridge line portion having a large shared load in the welded portion 16 can be reduced.

Further, in the present embodiment, the skeleton member 12 and the skeleton member 14 are formed of an aluminum alloy. In the aluminum arc welding, the strength difference between the base material and the bead is large, and cracking is more likely to occur in the root portion than in the iron, but according to the present embodiment, even in the aluminum arc welding, it is possible to effectively reduce cracking in the root portion. However, the skeleton member 12 and the skeleton member 14 are not necessarily aluminum alloys, and may be formed of other metals.

In the above-described embodiment, the skeleton members 12 and 14 each having a rectangular tubular shape are used as the skeleton member 10, and the skeleton member 12 as the first vehicle member and the skeleton member 14 as the second vehicle member are directly welded by fillet welding.

Figure 5:
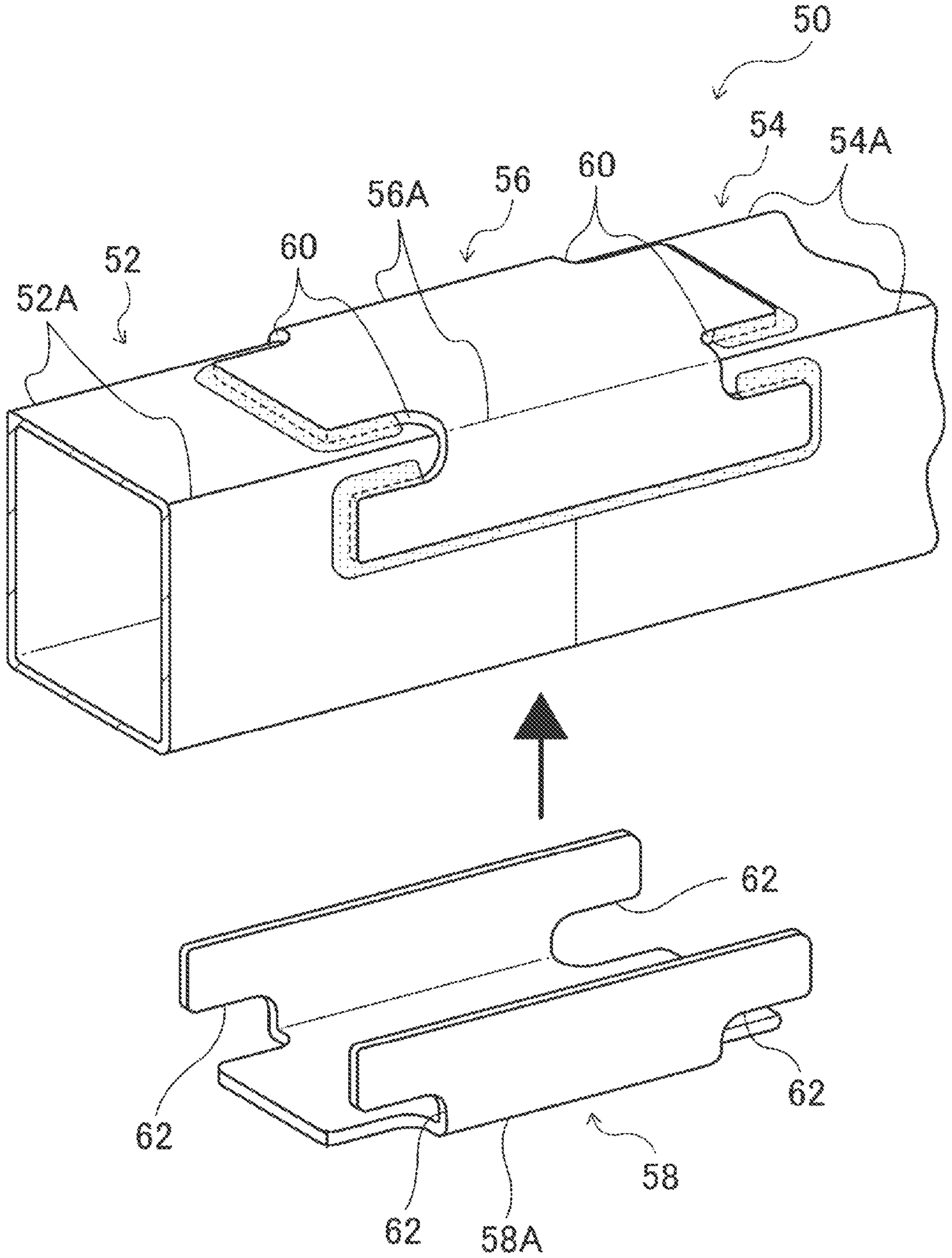
FIG. 5 is a partially exploded perspective view illustrating a modification of the joining structure of the vehicle member according to the present embodiment.

For example, briefly described as a modification, as shown in FIG. 5, the skeleton member 50 for a vehicle may be constituted by the skeleton members 52 and 54 as the first vehicle member forming a square tube shape, respectively, and the plate-like members 56 and 58 as the second vehicle member forming a U-shaped cross-sectional shape when cut along the width direction in contact with the outer surface of the skeleton members 52 and 54.

The plate-like members 56, 58 are respectively formed with cuts 60 and 62 therebetween along the ridge line 56A, 58A, and the plate-like member 56 is welded to the skeleton members 52, 54 are welded to the skeleton members 52 and 54 including the cut 60 (excluding the arc portion) in a state in which the ridge line (first ridge line) 52A, 54A on the upper side of the skeleton members 52 and 54 and the ridge line (second ridge line) 56A of the plate-like member 56 are overlapped. Further, the plate-like member 58 is welded to the skeleton members 52 and 54 including the cut 62 (except for the arc portion) while the ridge line 52A, 54A at the lower part of the skeleton members 52 and 54 and the ridge line (second ridge line) 58A of the plate-like member 58 are overlapped.

As a comparative example, for example, although not shown in the drawings, when the skeleton members 52 and 54 are butt-welded, if the base plate thickness and throat thickness cannot be sufficiently secured, the bonding strength of the skeleton members 52 and 54 is reduced. However, according to the present embodiment, it is possible to improve the joining strength of the skeleton members 52 and 54 by performing fillet welding of the plate-like members 56 and 58 as separate members.

Examples of the skeleton member 10 include a joint portion between a crash box and a front (rear) side member. In addition to this, it may also be a structure in which the two or more skeleton members are integrated by the melting in the rear floor side members, side members, suspension members, cross members, etc. Further, in the case of a configuration in which the vehicle skeleton is divided into left and right portions in the vehicle width direction, a modification can be applied particularly when the right skeleton member and the left skeleton member are welded. In addition, in a case where replacement is necessary in either one of the right skeleton member and the left skeleton member, the present embodiment may be applied.

Further, in the above embodiment, the skeleton members 12 and 14 have been described with respect to an example formed in a square tube shape, but the present disclosure is not limited to this configuration as long as the two vehicle members are welded by fillet welding.

Although an embodiment of the present disclosure has been described above, the present disclosure is not limited to such an embodiment, and the present disclosure may be used in combination with various modifications as appropriate. In addition, the present disclosure can be implemented in various forms without departing from the gist of the present disclosure.

Additional Remarks

Note that the vehicle lower structure according to the present disclosure may be formed by appropriately combining the following configurations.

Configuration 1

A joining structure for a vehicle member includes: a first vehicle member having a first ridge line in an extending direction of the first vehicle member; and a second vehicle member having a second ridge line that overlaps the first ridge line in an extending direction of the second vehicle member, and provided with a first welded portion in which the second vehicle member is welded to the first vehicle member from outside by lap fillet welding. The joining structure includes a cut provided in the second vehicle member and extending along the second ridge line so as to expose the first ridge line, and a second welded portion in which the second vehicle member is welded to the first vehicle member along the cut by fillet welding with the first ridge line located inside the cut.

Configuration 2

The second welded portion includes a pair of weld lines facing each other.

Configuration 3

A length of the weld line is set to be longer than a dimension of an entrance portion of the cut measured along an outer shape of the first vehicle member across the first ridge line.

Configuration 4

The first vehicle member and the second vehicle member are made of an aluminum alloy.

What is claimed is:

1. A joining structure for a vehicle member, the joining structure comprising:

- a first vehicle member comprising a tubular member comprising a first longitudinal axis and a polygonal cross-section having a first corner edge between adjacent sidewalls thereof and extending parallel to the first longitudinal axis in a first extending direction of the first vehicle member; and
- a second vehicle member comprising a tubular member or U-shaped plate, comprising a second longitudinal axis and a polygonal or U-shaped cross-section having a second corner edge between adjacent sidewalls thereof and extending parallel to the second longitudinal axis in a second extending direction of the second vehicle member, wherein the first vehicle member is received within the second vehicle member such that the second corner edge overlaps the first corner edge, wherein the second corner edge is provided with a cut extending from an end portion of the second vehicle member in the second extending direction along the second corner edge so as to expose the first corner edge, and wherein the first vehicle member and the second vehicle member are welded to each other by:

a first welded portion formed at the end portion of the second vehicle member by fillet welding, the first welded portion extending along an end edge surface of each sidewall of the second vehicle member and coupling the end edge surface to a respective sidewall of the first vehicle member; and a second welded portion formed by fillet welding along the cut with the first corner edge located inside the cut, the second welded portion extending along opposing edge surfaces of the cut and coupling each opposing edge surface to a respective sidewall of the first vehicle member without welding on the first corner edge.

2. The joining structure according to claim 1, wherein the second welded portion includes a pair of weld lines facing each other.

3. The joining structure according to claim 2, wherein a length of each of the weld lines is set to be longer than a dimension of an entrance portion of the cut measured along an outer shape of the first vehicle member across the first corner edge.

4. The joining structure according to claim 1, wherein the first vehicle member and the second vehicle member are made of an aluminum alloy.

5. The joining structure according to claim 1, wherein each of the first vehicle member and the second vehicle member has a square tubular shape, and the first vehicle member is inserted into the second vehicle member.

6. The joining structure according to claim 1, further comprising:

a third vehicle member comprising a tubular member comprising a third longitudinal axis and a polygonal cross-section having a third corner edge between adjacent sidewalls thereof and extending parallel to the third longitudinal axis in a third extending direction of the third vehicle member, wherein:

each of the first vehicle member and the third vehicle member has a square tubular shape, the first vehicle member and the third vehicle member are coaxial and end surfaces of the first and third vehicle members are in contact with each other, the second vehicle member has a plate shape, the first vehicle member and the third vehicle member are received within the second vehicle member such that the second corner edge overlaps the first corner edge and the third corner edge, and the second vehicle member is welded to the first vehicle member and the third vehicle member.

7. The joining structure according to claim 6, wherein:

the second vehicle member is provided with a second cut extending from another end portion opposite to the end portion along the second corner edge so as to expose the third corner edge, and the second vehicle member is welded to the third vehicle member by:

a third welded portion formed at the other end portion of the second vehicle member by fillet welding, the third welded portion extending along an end edge surface of each sidewall of the second vehicle member and coupling the end edge surface to a respective sidewall of the third vehicle member; and a fourth welded portion formed by fillet welding along the second cut with the third corner edge located inside the second cut, the fourth welded portion extending along opposing edge surfaces of the second cut and coupling each opposing edge surface to a respective sidewall of the third vehicle member without welding on the third corner edge.

* * * * *